Figure 1:
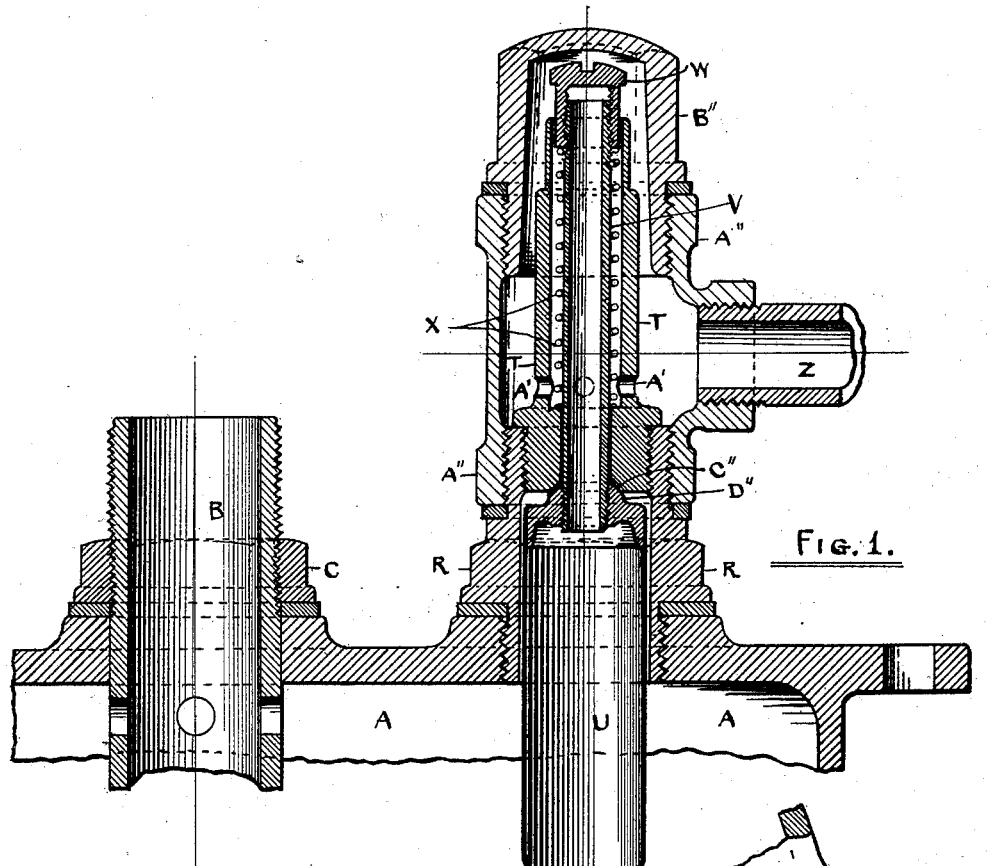
Figure 2:
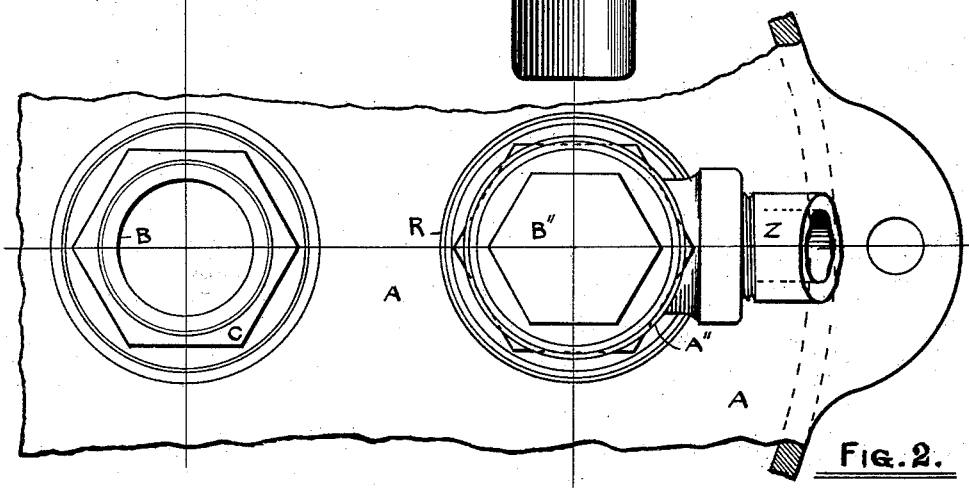

(No Model.)

M. J. SMITH
AIR VENT VALVE.

No. 338,196. Patented Mar. 16, 1886.

WITNESSES,
Melville Clemens
Thomas Britt

INVENTOR,
Michael J. Smith

UNITED STATES PATENT OFFICE.

MICHAEL J. SMITH, OF NEW YORK, N. Y.

AIR-VENT VALVE.

SPECIFICATION forming part of Letters Patent No. 338,196, dated March 16, 1886.

Application filed August 11, 1884. Serial No. 140,775. (No model.)

*To all whom it may concern:*

Be it known that I, MICHAEL J. SMITH, a citizen of the United States, residing at New York, in the county of New York and State of New York, have invented a new and useful Air-Vent Valve, shown in the drawings of my application for a patent for my improvement in water-closet tanks, filed January 16, 1884.

The following is a specification of my said air-vent valve, reference being made to the drawings accompanying my said application, filed January 16, 1884.

Said air-vent valve consists of a short tube, R, fixed in the top plate or cover of a cistern or air-tight vessel, as the tank A. On the tube R is fixed a common T, with a cap on it. Centrally inside of tube R is fixed a tube, T, having air-vent holes A' A' A' A', made transversely in it near its base. The tube T has a valve-seat formed at its lower end, on which seats a valve formed on the head of a closed cylinder or float, U, to which is attached a tubular valve-stem, V, carrying at its upper end an adjustable spring-compression screw-nut, W, working freely in tube T. A coiled spring, X, on tube V supports most of the weight of float U, tube V, and nut W, so that with a small float, similar to U, the water as it fills the vessel A will carry the float-valve securely to its seat, and when the water is drawn out of vessel A the float-valve will fall from its seat and admit air into vessel A.

It is evident that said air-vent valve serves both to allow air to escape from the vessel A as it is being filled with water, and stops water-overflow when the vessel is filled with water, and to admit air into the vessel to prevent a vacuum therein while the water is being discharged or drawn out of it.

I claim as my invention and desire to secure by Letters Patent—

The described and shown air-vent valve, consisting of tube R, tube T, with vent-holes A' A', float U, valve-stem V, adjusting-nut W, and coil-spring X, all arranged within the described common T, and connected to the vessel A, all substantially as and for the purposes set forth.

MICHAEL J. SMITH.

Witnesses:
JAMES DOWLING,
JAMES J. KEANE.